Sept. 20, 1955
M. STRAUSS ET AL
2,718,317
INSTALLATIONS FOR THE STORAGE OF
GOODS, ESPECIALLY FOR THE
PARKING OF AUTOMOBILES
Filed Oct. 2, 1953
2 Sheets-Sheet 1
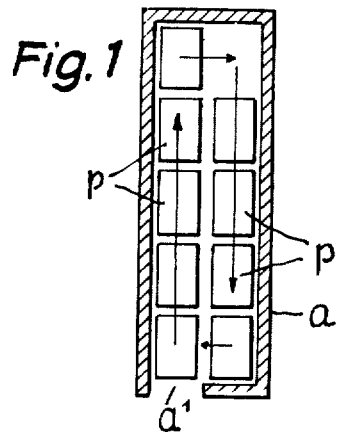
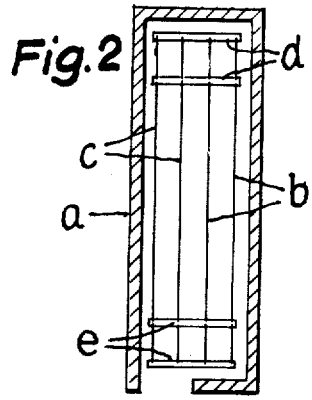
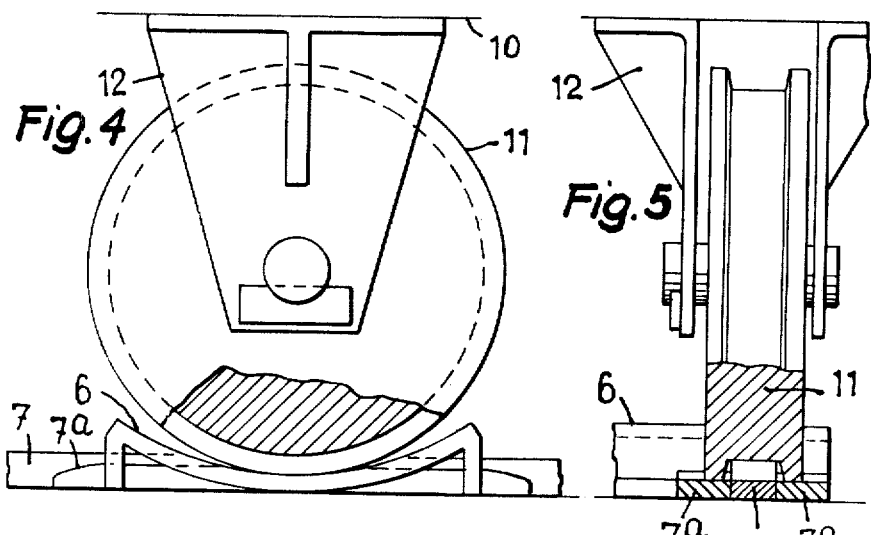
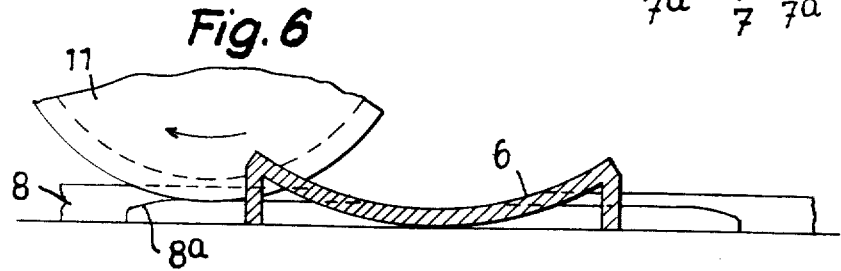
INVENTORS:
MANFRED STRAUSS AND
PAUL TRUNINGER

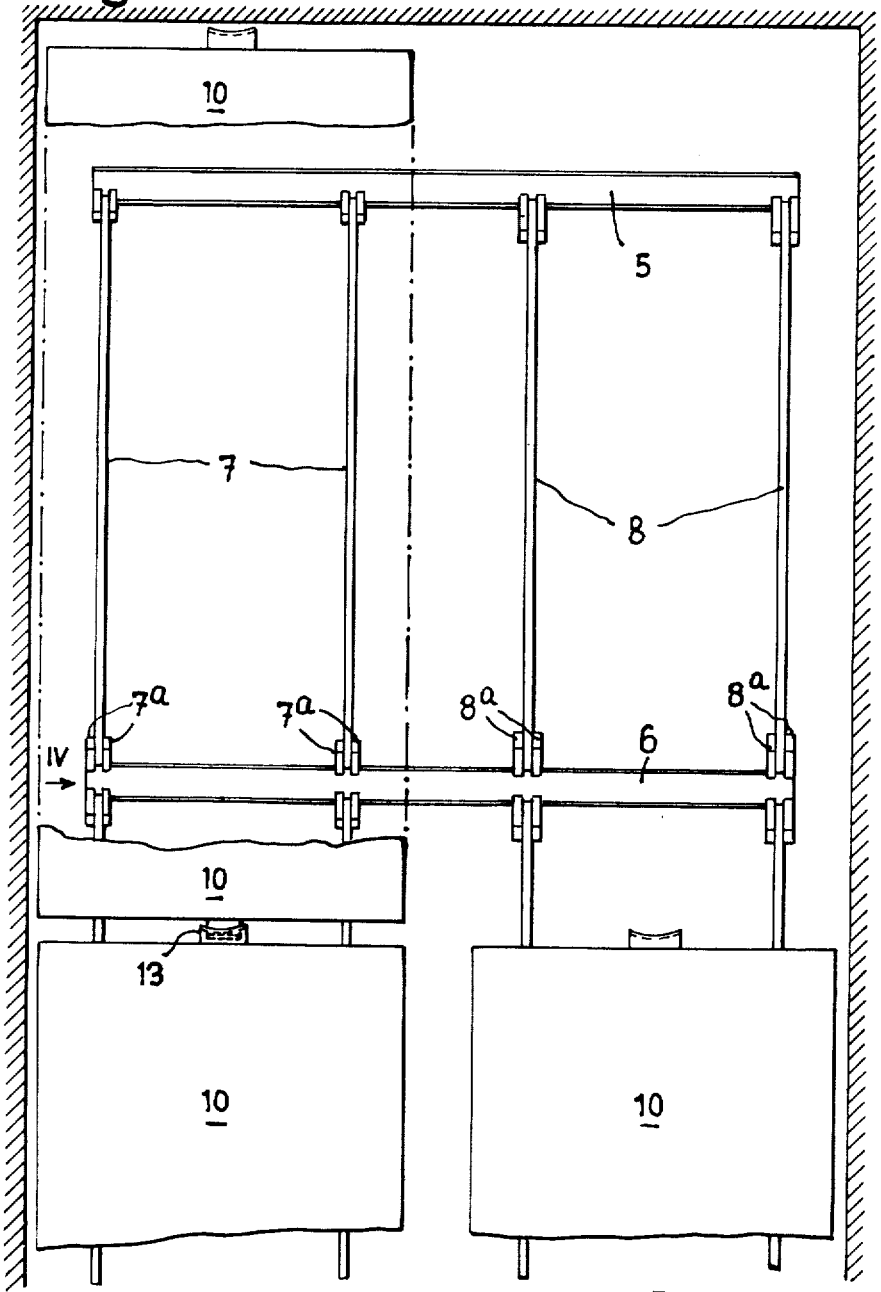

United States Patent Office 2,718,317
Patented Sept. 20, 1955

2,718,317

INSTALLATIONS FOR THE STORAGE OF GOODS, ESPECIALLY FOR THE PARKING OF AUTOMOBILES

Manfred Strauss, Basel, and Paul Truninger, Solothurn, Switzerland, assignors to Buss A. G., Basel Switzerland Application October 2, 1953, Serial No. 383,836

Claims priority, application Switzerland December 2, 1952

6 Claims. (Cl. 214—16.1)

The present invention relates to an installation for the storage of goods, more particularly for the parking of automobiles, with platform trucks for receiving the goods, which platform trucks are moved on two juxtaposed parallel longitudinal tracks and can be transferred from one longitudinal track to the other on two transverse tracks provided at the ends of said longitudinal tracks.

Installations of that type are known in different forms. They have the advantage that for instance in a parking installation a maximum number of automobiles can be parked on a given area. The automobiles may be parked closely behind and beside each other, provided that one position is always left free to permit of moving the trucks in the longitudinal and transverse directions to drive the desired automobile out of the parking space. In spite of its advantages such installation has not achieved commercial success so far because the movement of the trucks in two orthogonal directions represents a problem which involves techanical difficulties and has not been solved satisfactorily so far.

It is an object of the invention to provide an installation of the type described, in which the previously hindering technical difficulties are overcome thereby that an installation for the storage of goods, which comprises a plurality of platform trucks having runner wheels and adapted to receive the goods to be stored, is provided with the combination of two juxtaposed parallel longitudinal tracks consisting each of two rails, and two transverse tracks forming at each end of said longitudinal tracks two trough-shaped guideways spaced by the wheelbase of the trucks and extending across both longitudinal tracks, the rails of the longitudinal tracks and said guideways being shaped at their crossings to provide freedom of movement of the runner wheels when at said crossings to roll along the rails and to slip laterally on the trough-shaped guideways.

To this end the rails of the longitudinal tracks may be shaped at their crossings with the guideways in conformity with the cross section of the latter.

Further the invention teaches to provide coupling means connected to said trucks and coupling them in the direction of the longitudinal tracks while providing freedom of independent movement of said trucks in the direction of said transverse tracks.

Additional objects and features of the invention will be apparent from the following description thereof, given with reference to the accompanying drawing, in which an example of the subject of the invention is shown in the form of a parking installation for automobiles, in which:

Fig. 1 is a schematical top plan view of the installation with the trucks, the longitudinal and transverse tracks being omitted, Fig. 2 a similar top plan view showing the longitudinal and transverse tracks, Fig. 3 a top plan view on a larger scale, showing one end portion of the plant with the trucks shown broken away, Fig. 4 a side view taken in the direction of the arrow IV of Fig. 3 and showing a crossing of a longitudinal track and a transverse track, and a runner wheel, partly broken away, Fig. 5 a partly sectional end view appertaining to Fig. 4, and Fig. 6 a cross sectional view of another crossing, with the runner wheels in a different position.

Figs. 1 and 2 give a general illustration of the parking installation, which may be accommodated in a long hall $a$ with an entrance and outlet $a^1$. As shown in Fig. 2, the installation comprises two parallel longitudinal tracks $b$ and $c$, consisting each of two rails, and at the ends thereof two transverse tracks $d$ and $e$, which will be described in detail hereinafter. Platform trucks $p$ having four runner wheels and serving to receive the automobiles to be stored are provided on the longitudinal tracks $b$ and $c$ in such a number as to leave one position free, as is shown in Fig. 1, so that the trucks can be moved as is indicated by arrows and each of them can be driven to the entrance or outlet $a^1$ to receive or deliver an automobile.

As will be explained further with reference to Fig. 3, the above-mentioned transverse tracks, designated with $d$ and $e$ in Fig. 2, and provided at the ends of the longitudinal tracks $b$ and $c$, comprise two crossmembers 5 and 6 spaced by the wheelbase of the trucks and forming trough-shaped guideways which extend across the pairs of rails 7 and 8 of both longitudinal tracks. At the crossings of the longitudinal rails 7 and 8 with the crossmember 6 the former have a recess conforming to the cross-sectional shape of the trough surface of the crossmembers, as is apparent from Figs. 4 and 5. Moreover, ramps 7a and 8a are provided at these crossings on both sides of the longitudinal rails 7 and 8, which ramps also have recesses corresponding to the trough shape of the crossmembers. The trucks designated with 10 in Fig. 3 are provided with four flanged wheels 11 (Figs. 4 and 5), which are journalled in carrying straps 12 fixed on both sides of the truck to the platform thereof so that the axis of rotation of the wheels is fixed relative to the platform truck. When such a truck wheel is considered, it becomes apparent that as long as it is on a longitudinal rail it rests thereon with the tread of the wheel body. However, when upon a movement of the truck the runner wheel reaches a crossing of the two tracks, it will run with its flanges onto the two lateral ramps 7a and 8a (see Fig. 6) and unless it is caused to roll forward will reach the trough-shaped crossmember (see Fig. 4). Similarly the other runner wheels of the truck reach the crossmembers 5 and 6 so that the truck can now be displaced laterally, if desired, the runner wheels thereof performing corresponding lateral slipping movements. Thus the respective truck can be moved from one longitudinal track to the other. To avoid unequal wear of the runner wheels 11, it is desirable that they should perform their lateral slipping movements always on other peripheral parts of their flanges. To this end the several ramps are of unequal length so that the runner wheels perform on said ramps rolling movements of unequal length and thus engage the crossmembers always with another peripheral part of their flanges. It is understood that instead of two flanges the runner wheels might have only one flange so that only one lateral ramp would be necessary for each crossing. To reduce the friction between the runner wheels and the crossmembers during the lateral slipping of the platforms as far as possible, the trough-shaped crossmembers can be utilized at the same time as oil sumps. The trucks are intercoupled with couplings 13 not described here in detail and constructed so that they are effective only in the longitudinal direction, not in the transverse direction of the installation, so as not to resist the lateral movement of the trucks on the transverse tracks.

In Fig. 1 an installation comprising nine trucks has been shown for purposes of illustration. Obviously that installation could be built for longer rows of trucks and in dependence on the space available several such installations could be accommodated in a single building of larger width. Similarly the trucks could be arranged with their longitudinal axis transversely to the longitudinal tracks instead of parallel thereto.

We claim:

1. In an installation for the storage of goods, which comprises a plurality of platform trucks having runner wheels the axis of rotation of which is fixed relative to said tracks and adapted to receive the goods to be stored, the combination of two juxtaposed parallel longitudinal tracks consisting each of two rails, and two transverse tracks positioned at each end of said longitudinal tracks and formed as two trough-shaped guideways with substantially the same curvature as said wheels spaced by the wheelbase of the trucks and extending across both longitudinal tracks, the rails of the longitudinal tracks and said guideways being shaped at their crossings to provide freedom of movement of the runner wheels of a truck when at said crossings to roll along the rails and to slip laterally on the trough-shaped guideways.

2. In an installation for the storage of goods, which comprises a plurality of platform trucks having runner wheels the axis of rotation of which is fixed relative to said tracks and adapted to receive the goods to be stored, the combination of two juxtaposed parallel longitudinal tracks consisting each of two rails, and two transverse tracks positioned at each end of said longitudinal tracks and formed as two trough-shaped guideways with substantially the same curvature as said wheels spaced by the wheelbase of the trucks and extending across both longitudinal tracks, the rails of the longitudinal tracks being shaped at their crossings with said guideways in conformity with the cross-section of the latter.

3. In an installation for the storage of goods, which comprises a plurality of platform trucks having runner wheels the axis of rotation of which is fixed relative to said tracks with at least one flange and adapted to receive the goods to be stored, the combination of two juxtaposed parallel longitudinal tracks consisting each of two rails, two transverse tracks positioned at each end of said longitudinal tracks and formed as two trough-shaped guideways with substantially the same curvature as said flanges spaced by the wheelbase of the trucks and extending across both longitudinal tracks, the rails of the longitudinal tracks and said guideways being shaped at their crossings to provide freedom of movement of the runner wheels of a truck when at said crossings to roll along the rails and to slip laterally on the trough-shaped guideways, and a ramp arranged laterally of each of said rails at its crossing with each of said guideways, for engaging said flange and guiding it into and out of engagement with said guideway.

4. In an installation for the storage of goods, which comprises a plurality of platform trucks having runner wheels the axis of rotation of which is fixed relative to said tracks with at least one flange and adapted to receive the goods to be stored, the combination of two juxtaposed parallel longitudinal tracks consisting each of two rails, two transverse tracks positioned at each end of said longitudinal tracks and formed as two trough-shaped guideways with substantially the same curvature as said flanges spaced by the wheelbase of the trucks and extending across both longitudinal tracks, and a ramp arranged laterally of each of said rails at its crossing with each of said guideways, for engaging said flange and guiding it into and out of engagement with said guideway, the rails of the longitudinal tracks and said ramps being shaped at their crossings with said guideways in conformity with the cross-section of the latter.

5. In an installation for the storage of goods, which comprises a plurality of platform trucks having runner wheels the axis of rotation of which is fixed relative to said tracks with at least one flange and adapted to receive the goods to be stored, the combination of two juxtaposed parallel longitudinal tracks consisting each of two rails, two transverse tracks positioned at each end of said longitudinal tracks and formed as two trough-shaped guideways with substantially the same curvature as said flanges spaced by the wheelbase of the trucks and extending across both longitudinal tracks, the rails of the longitudinal tracks and said guideways being shaped at their crossings to provide freedom of movement of the runner wheels of a truck when at said crossings to roll along the rails and to slip laterally on the trough-shaped guideways, and a ramp arranged laterally of each of said rails at its crossing with each of said guideways, for engaging said flange and guiding it into and out of engagement with said guideway, said ramps being of different length at the several crossings to cause the engagement of the guideways by different peripheral portions of the flange.

6. In an installation for the storage of goods, the combination of a plurality of platform trucks having runner wheels the axis of rotation of which is fixed relative to said tracks and adapted to receive the goods to be stored, two juxtaposed parallel longitudinal tracks consisting each of two rails, two transverse tracks positioned at each end of said longitudinal tracks and formed as two trough-shaped guideways with substantially the same curvature as said flanges spaced by the wheelbase of the trucks and extending across both longitudinal tracks, the rails of the longitudinal tracks and said guideways being shaped at their crossings to provide freedom of movement of the runner wheels of a truck when at said crossings to roll along the rails and to slip laterally on the trough-shaped guideways, and coupling means connected to said trucks and coupling them in the direction of the longitudinal tracks while providing freedom of independent movement of said trucks in the direction of said transverse tracks.

References Cited in the file of this patent

UNITED STATES PATENTS

| 786,193 | Cooke | Mar. 28, 1905 |
| 1,775,799 | Young | Sept. 16, 1930 |
| 1,896,021 | Taylor | Jan. 31, 1933 |

FOREIGN PATENTS

| 501,745 | Belgium | June 6, 1952 |